(12) United States Patent  
Sato

(10) Patent No.: US 7,780,191 B2  
(45) Date of Patent: Aug. 24, 2010

(54) SIDE AIRBAG APPARATUS

(75) Inventor: Yuji Sato, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 274 days.

(21) Appl. No.: 12/010,899

(22) Filed: Jan. 31, 2008

(65) Prior Publication Data

US 2008/0185824 A1 Aug. 7, 2008

(30) Foreign Application Priority Data

Feb. 5, 2007 (JP) ............................. 2007-025554

(51) Int. Cl.
*B60R 21/21* (2006.01)
(52) U.S. Cl. ..................... 280/730.2; 280/729
(58) Field of Classification Search .............. 280/730.2, 280/729

See application file for complete search history.

(56) References Cited

U.S. PATENT DOCUMENTS

| | | | | |
|---|---|---|---|---|
| 7,168,733 B2 * | 1/2007 | Kumagai et al. | ......... | 280/730.2 |
| 7,384,062 B2 * | 6/2008 | Yokoyama et al. | ....... | 280/730.2 |
| 7,422,234 B2 * | 9/2008 | Huber et al. | ............. | 280/730.2 |
| 7,448,645 B2 * | 11/2008 | Bederka et al. | .......... | 280/730.2 |
| 7,581,752 B2 * | 9/2009 | Kai et al. | .................. | 280/730.2 |
| 7,604,252 B2 * | 10/2009 | Heitplatz et al. | ......... | 280/730.1 |
| 2005/0189742 A1 * | 9/2005 | Kumagai et al. | ......... | 280/730.2 |
| 2007/0170707 A1 * | 7/2007 | Sato et al. | ................. | 280/730.2 |
| 2007/0228699 A1 * | 10/2007 | Bederka et al. | .......... | 280/730.2 |
| 2007/0228701 A1 * | 10/2007 | Yamamura | ............... | 280/730.2 |
| 2007/0284859 A1 * | 12/2007 | Kashiwagi | ............... | 280/730.2 |
| 2008/0174093 A1 * | 7/2008 | Inoue | ....................... | 280/730.2 |
| 2009/0039624 A1 * | 2/2009 | Yokota | ....................... | 280/729 |
| 2009/0072523 A1 * | 3/2009 | Yokota | ..................... | 280/730.2 |
| 2009/0212542 A1 * | 8/2009 | Toda et al. | ............... | 280/730.2 |

FOREIGN PATENT DOCUMENTS

JP 2004-210048 A 7/2004

* cited by examiner

*Primary Examiner*—Paul N Dickson
*Assistant Examiner*—Drew Brown
(74) *Attorney, Agent, or Firm*—Posz Law Group, PLC

(57) ABSTRACT

A side airbag apparatus includes an inflator assembly and an airbag. The airbag includes an upper chamber and a lower chamber, which communicate with each other via a communication portion. In the side airbag apparatus, gas is discharged from the inflator assembly in response to an impact from the side of a vehicle. The gas causes the lower chamber to be inflated and deployed beside the occupant with the internal pressure higher than that of the upper chamber. The side airbag apparatus further includes an auxiliary inflation section, which is part of the airbag and is inflated by gas around the communication portion. In the inflation process of the airbag, when the auxiliary inflation section starts inflating, the flow passage area of the communication portion is reduced, thereby suppressing the flow of gas in the communication portion.

7 Claims, 8 Drawing Sheets

SIDE AIRBAG APPARATUS

BACKGROUND OF THE INVENTION

The present invention relates to a side airbag apparatus that protects an occupant from impact applied from a side of a vehicle, and in particular, the present invention pertains to a side airbag apparatus in which the airbag is provided with chambers that are inflated with different internal pressure levels.

A side airbag apparatus is widely known as an apparatus for protecting an occupant from impact applied from a side of a vehicle, such as in the case of side collision. The side airbag apparatus includes an inflator and an airbag. In the side airbag apparatus, when an impact is applied from the side of a body side portion of a vehicle, the inflator discharges gas into the airbag. The discharged gas causes the airbag to shoot forward from the seat back, which is then inflated and deployed in a narrow space between an occupant seated in the vehicle seat and the body side portion so as to reduce the impact applied to the occupant from the side via the body side portion.

In general, in regard to the side portion of a human body, the lumbar region has higher impact resistance than the chest region. Thus, in the case with the side airbag apparatus that protects an area from the chest region to the lumbar region of the occupant, the impact applied to the chest region of the occupant by the inflation and deployment of the airbag is desirably smaller than the impact applied to the lumbar region.

Thus, a side airbag apparatus has been proposed in which the internal space of the airbag is divided into an upper chamber corresponding to the chest region of the occupant and a lower chamber corresponding to the lumbar region. For example, in a side airbag apparatus disclosed in Japanese Laid-Open Patent Publication No. 2004-210048, the airbag is provided with a coupling portion, which couples an upper chamber and a lower chamber. An inflator having two outlets is arranged at the coupling portion. Part of the airbag corresponding to the coupling portion is tightened to the inflator by a tightening member such as a hose band. In the side airbag apparatus, in response to an impact from the side of the vehicle, gas is discharged to the upper chamber from an upper outlet of the inflator, and gas is discharged to the lower chamber from a lower outlet by an amount greater than that discharged to the upper chamber. As a result, part of the airbag corresponding to the lower chamber is inflated and deployed beside the lumbar region with high internal pressure, and part of the airbag corresponding to the upper chamber is inflated and deployed beside the chest region with low internal pressure. Thus, the airbag is brought into contact with the occupant with the internal pressure appropriate to the impact resistance of each region of the occupant so as to effectively protect each region of the occupant from the impact. Since the upper chamber and the lower chamber are hermetically separated by the tightening member, gas does not flow between the chambers, and the internal pressure difference of the chambers is maintained.

Also, a side airbag apparatus has been proposed in which an inflator having one outlet is arranged in a communication portion. In such a side airbag apparatus, when gas is discharged from the outlet of the inflator in response to the impact from the side of the vehicle, gas is first supplied to the lower chamber, and then flows into the upper chamber through the communication portion. Since the gas flows in this order, the lower chamber is inflated and deployed in preference to the upper chamber, and is inflated and deployed with the internal pressure higher than that of the upper chamber. That is, in this side airbag apparatus also, the difference between the impact resistance between regions of the occupant is taken into consideration for the pressure distribution in the airbag.

However, according to the side airbag apparatus disclosed in Japanese Laid-Open Patent Publication No. 2004-210048, the coupling portion merely functions as a position for arranging the inflator. Part of the airbag corresponding to the coupling portion is brought into close contact with the inflator by the tightening member. That is, the coupling portion is closed, and the flow of gas at the coupling portion is always blocked. Thus, the flow of gas at the coupling portion cannot be controlled, and the internal pressure difference between the upper and lower chambers is determined by the amount of gas discharged from the outlets of the inflator.

Furthermore, according to the latter side airbag apparatus, the communication portion functions as a position for arranging the inflator, and also as a passage for allowing the gas to flow from the lower chamber to the upper chamber. However, in this side airbag apparatus, the area of the passage in the communication portion is uniform, and the communication portion does not control the flow of gas. Thus, in this case also, the internal pressure difference between the upper and lower chambers is determined by the discharged amount of gas from the outlet, the area of the passage in the communication portion, and the like.

SUMMARY OF THE INVENTION

Accordingly, it is an objective of the present invention to provide a side airbag apparatus that sets transient property of an internal pressure difference between chambers by controlling the flow of gas in a communication portion.

To achieve the foregoing objective and in accordance with one aspect of the present invention, a side airbag apparatus, which reduces impact from a side of a vehicle to protect an occupant, is provided. The apparatus includes an inflator, which discharges gas, an airbag, a pair of chambers formed by partitioning an internal space of the airbag, a communication portion, and an auxiliary inflation section. The airbag is inflated and deployed between a body side portion of the vehicle and the occupant by gas discharged from the inflator in response to impact from the side of the vehicle. One of the pair of chambers is deployed and inflated with higher internal pressure than the other one. The communication portion is provided in the airbag. The pair of chambers communicate with each other via the communication portion. The auxiliary inflation section is part of the airbag and is inflated around the communication portion by the gas.

DETAILED DESCRIPTION OF THE PREFERRED EMBODIMENTS

First Embodiment

A first embodiment of the present invention will now be described with reference to FIGS. 1 to 7. Hereinafter, the forward direction of a vehicle will be referred to as the front of the vehicle, and the backward direction of the vehicle will be referred to as the back of the vehicle. The vertical direction refers to the vertical direction of the vehicle, and the left and right direction refers to the width direction of the vehicle, that is, the left and right direction when the vehicle is driving forward.

Figure 1:
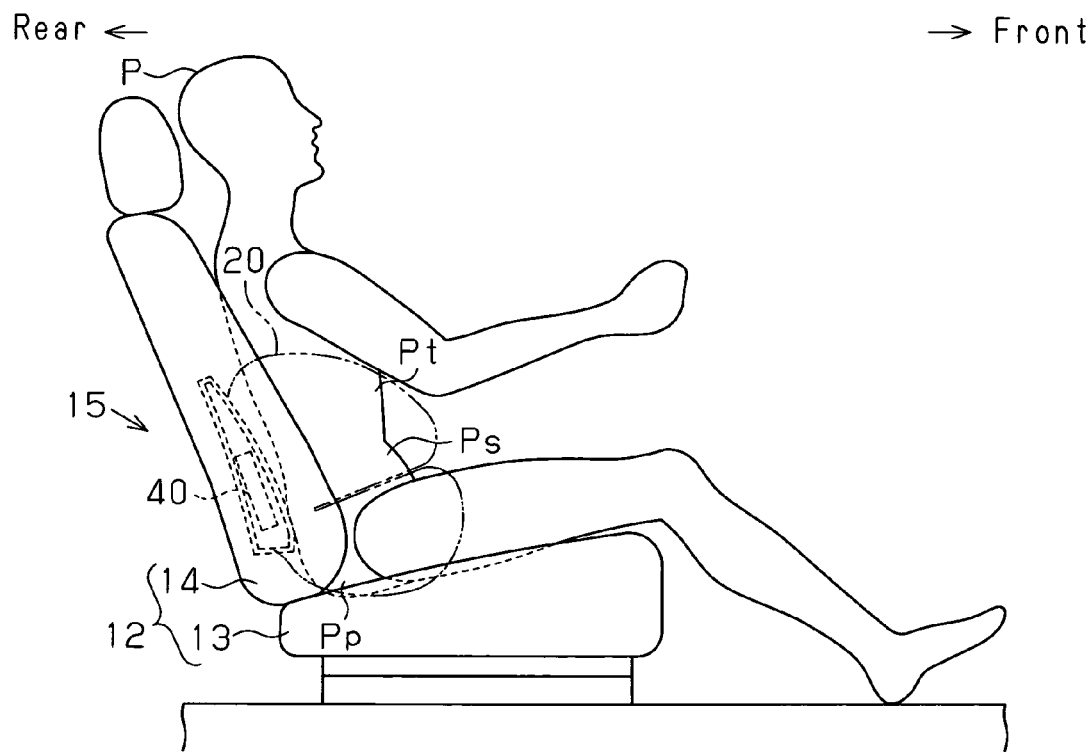
FIG. 1 is a side view illustrating a vehicle seat on which a side airbag apparatus according to a first embodiment of the present invention is mounted.
Figure 2:
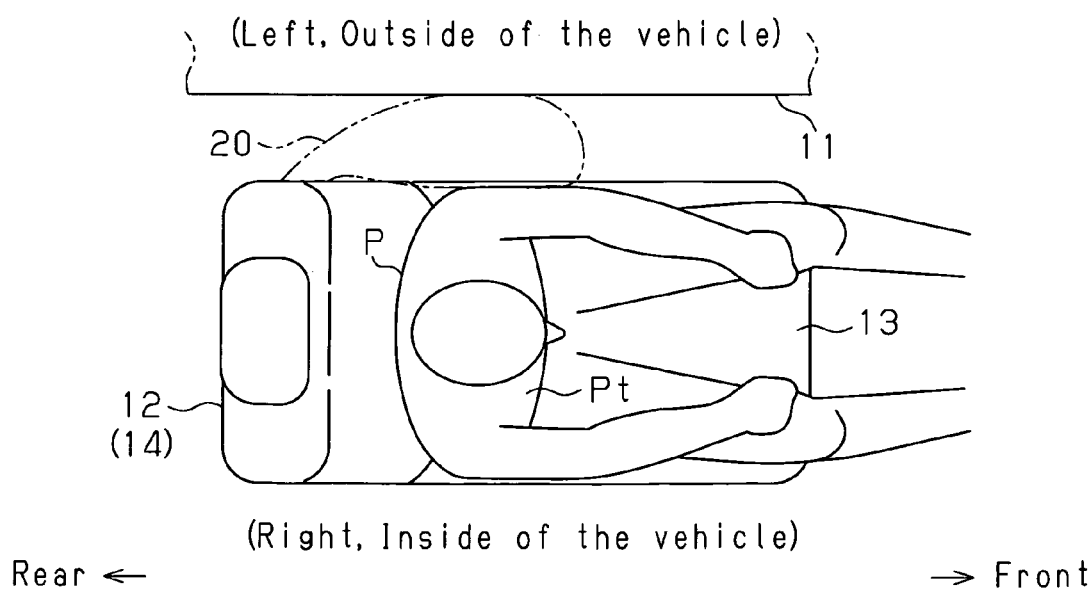
FIG. 2 is a plan view for explaining the positional relationship between the vehicle seat and a body side portion.

As shown in FIGS. 1 and 2, in the vehicle, a vehicle seat 12 is arranged in the vicinity of a body side portion 11. The body side portion 11 is a component of the side portion of the vehicle, and is mainly composed of a door, a pillar, and the like. Part of the body side portion 11 corresponding to the front seat includes a front door, a center pillar (B-pillar), and the like, and part of the body side portion 11 corresponding to the rear seat includes a rear part of the side door (rear door), a C-pillar, a front part of the wheel well, a rear quarter, and the like.

Figure 4:
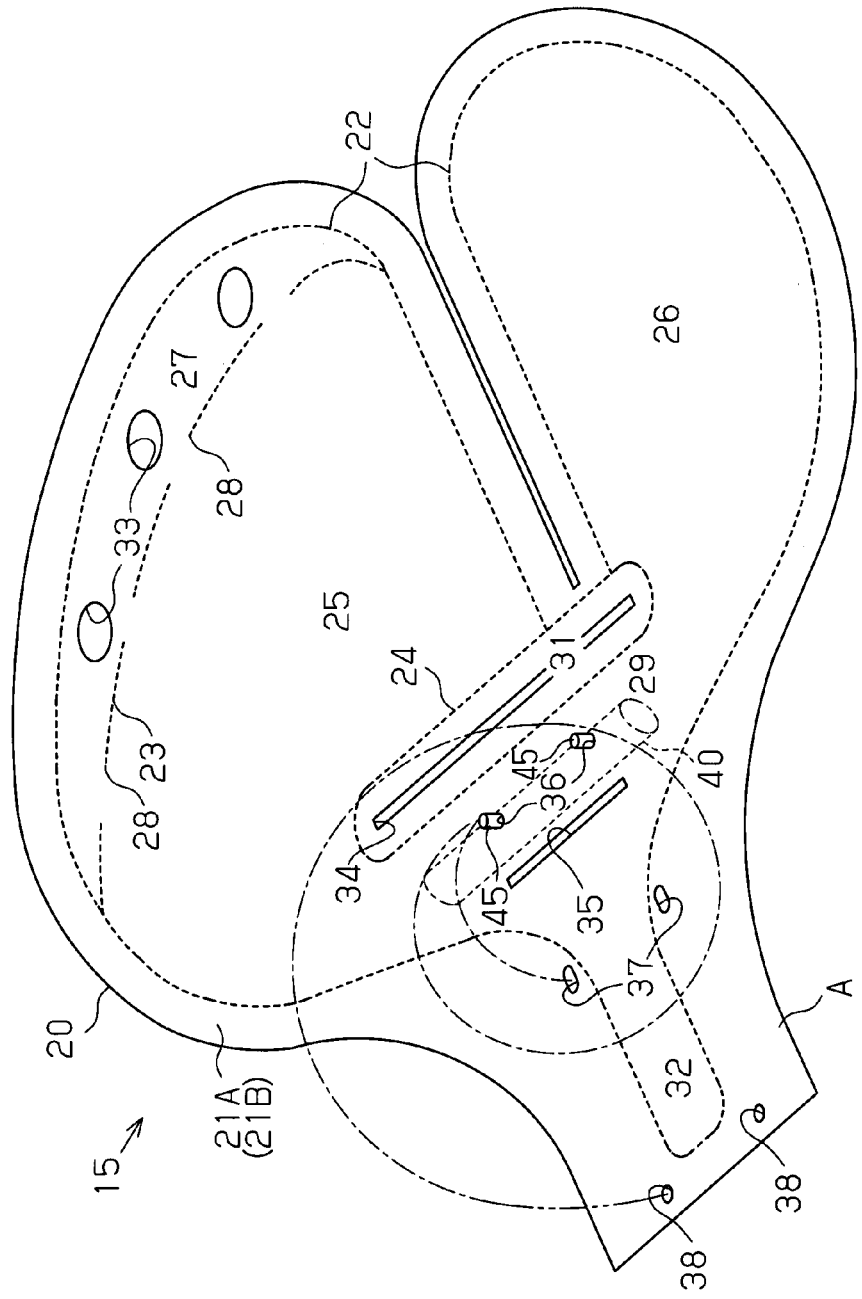
FIG. 4 is a perspective view of an airbag module, showing a state before an auxiliary inflation section is wound around a communication portion.

The vehicle seat 12 includes a seat cushion (seat portion) 13 and a seat back (backrest portion) 14. An airbag module 15, which is the main part of the side airbag apparatus, is installed in the side portion of the seat back 14 closer to the outside of the vehicle. The airbag module 15 includes an airbag 20 and an inflator assembly 40. Each of the components will now be described. FIG. 4 shows the airbag module 15 in a state where the airbag 20 is deployed without being supplied with gas.

<Airbag 20>

Figure 3:
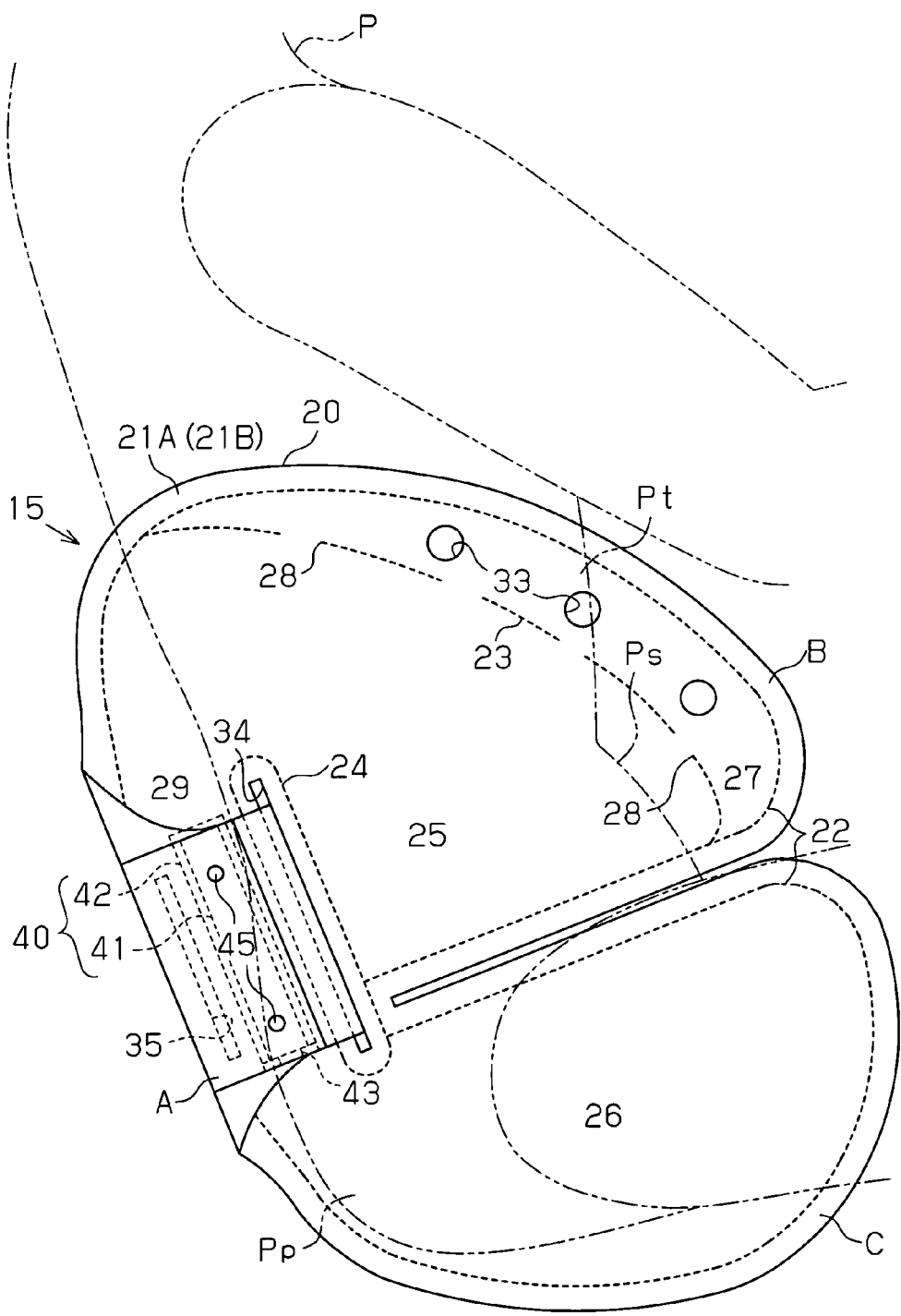
FIG. 3 is a side view illustrating a state where the airbag is deployed.

As shown in FIG. 3, the airbag 20 is formed by a base fabric sheet in a bag shape. The base fabric may be formed of material having high strength and flexibility so as to be easily folded such as woven cloth formed of polyester thread, polyamide thread, and the like.

When forming the airbag 20, first, the base fabric sheet having a predetermined shape is folded in half at the center. This forms a pair of overlapping parts 21A, 21B (see FIGS. 6(A) and 6(B)) having the same shape as each other. The overlapping parts 21A, 21B have a size and shape that cover an area from the lumbar region Pp to the chest region Pt of the occupant P when the airbag 20 is inflated and deployed. The pair of overlapping parts 21A, 21B may be formed by overlapping two base fabric sheets. In this case, the base fabric sheets configure the overlapping parts 21A, 21B.

Figure 5:
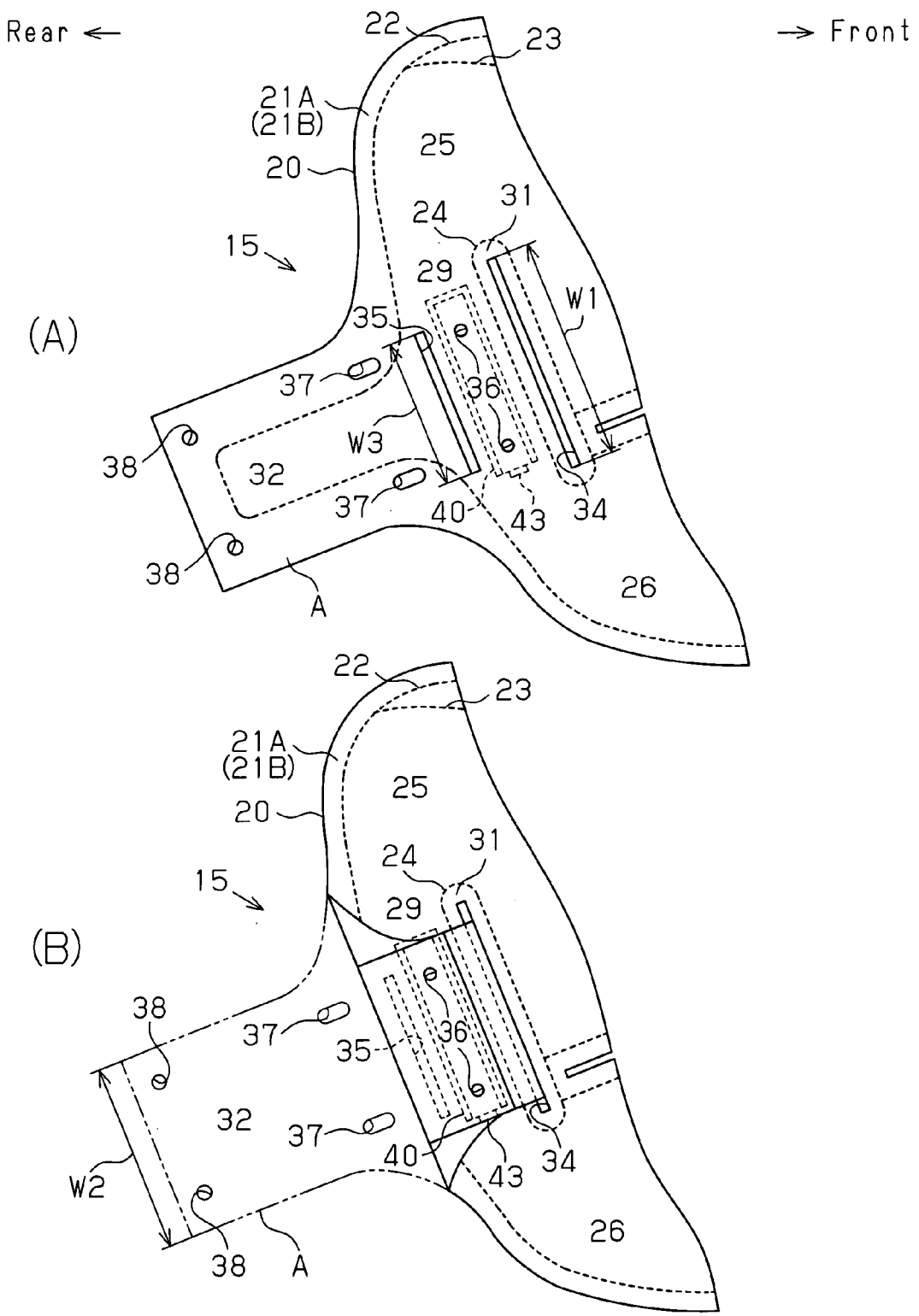
FIG. 5(A) is a partial side view of the airbag module, showing a state before the auxiliary inflation section is wound around the communication portion.
FIG. 5(B) is a partial side view of the airbag module, showing a state where the auxiliary inflation section is wound around the communication portion.
Figure 6:
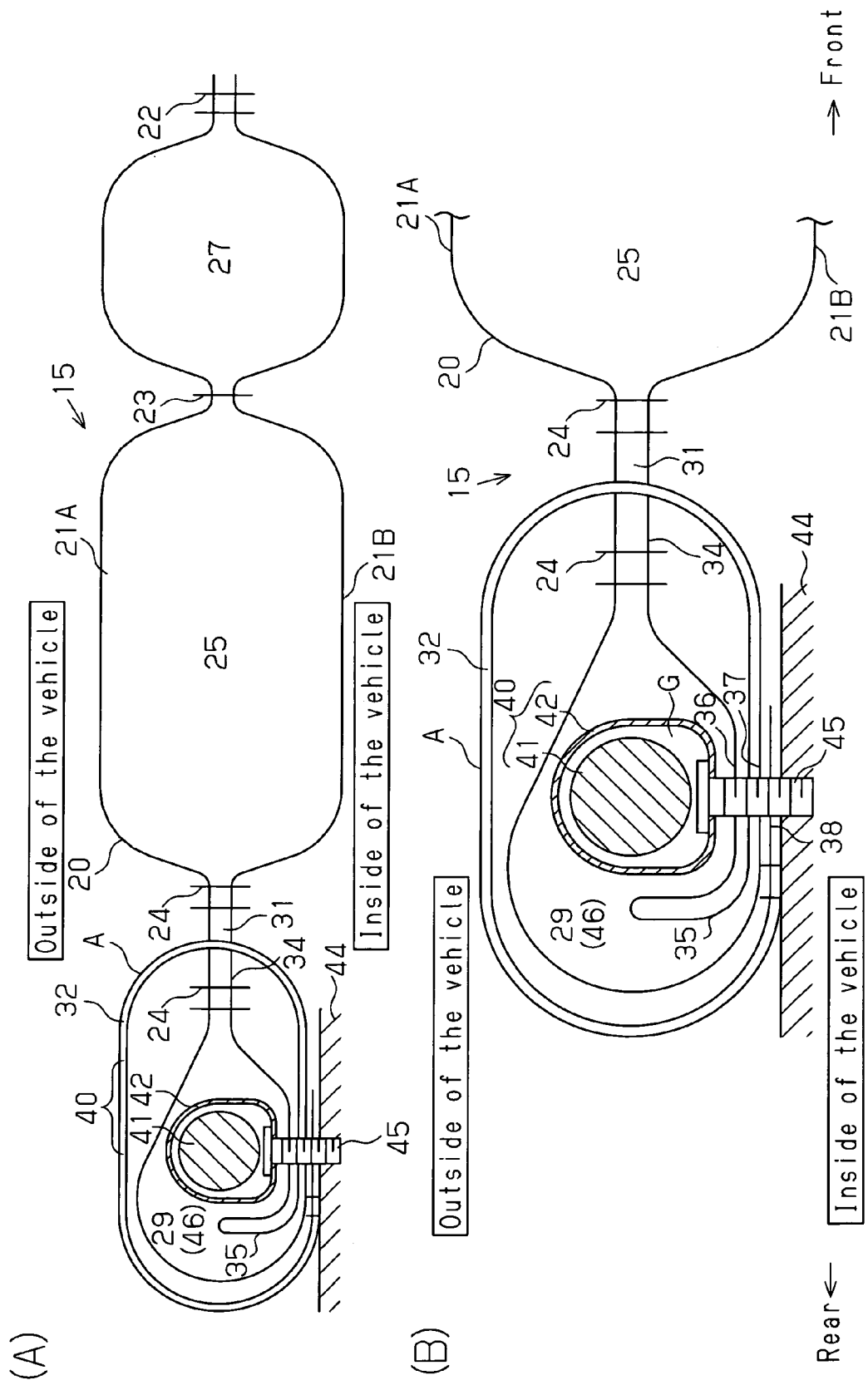
FIG. 6(A) is a cross-sectional plan view of the airbag module, showing a state before the auxiliary inflation section is inflated.
FIG. 6(B) is an enlarged cross-sectional plan view partially illustrating the auxiliary inflation section and the surrounding part.

The overlapping parts 21A, 21B are joined by joints 22 to 24 as shown by thick chain lines in FIG. 3. The joints 22 to 24 are parts of the overlapping parts 21A, 21B sewn by sewing thread. The joints 22 to 24 may be, for example, parts adhered by an adhesive. Furthermore, the joints 22 to 24 may be formed by one piece of sewing thread or by more than one piece (for example, two pieces) of sewing thread. As shown in FIG. 6(A), in the first embodiment, the joint 23 is formed by one piece of sewing thread, and the joints 22, 24 are formed by two pieces of sewing thread. In FIGS. 3 to 5, one of the two pieces of sewing thread configuring the joints 22, 24 is omitted.

As shown in FIGS. 3 and 4, the joints 22 to 24 include a peripheral joint 22, which joins the overlapping parts 21A, 21B at the peripheral part of the airbag 20, and a first inner joint 23 and a second inner joint 24, which join the overlapping parts 21A, 21B inward of the peripheral joint 22. The second inner joint 24 does not have ends so that gas does not enter the space surrounded by the second inner joint 24. The joints 22 to 24 divide the inner space of the airbag 20 into an upper chamber 25, a lower chamber 26, a gas discharge chamber 27, a communication portion 29, a non-inflation section 31, and an auxiliary inflation section 32.

The upper chamber 25 is inflated in the vicinity of the side of the chest region Pt and the abdominal region Ps of the occupant P. The upper chamber 25 is located substantially at the upper and middle portions of the inner space of the airbag 20. The lower chamber 26 is inflated in the vicinity of the side of the lumbar region Pp of the occupant P with the internal pressure greater than that in the upper chamber 25. The lower chamber 26 is smaller than the upper chamber 25, and is located substantially at the lower portion of the internal space of the airbag 20.

The gas discharge chamber 27 is a space for discharging gas supplied to the upper chamber 25, and is located substantially in front of the upper chamber 25. The gas discharge chamber 27 is adjacent to the upper chamber 25 with the first inner joint 23 located in between. The first inner joint 23 is provided with slits 28 so that the upper chamber 25 communicates with the gas discharge chamber 27. In the first embodiment, the slits 28 are provided at substantially equal intervals on the first inner joint 23. The number and positions of the slits 28 may be changed (only one slit 28 may be provided).

The communication portion 29 connects the rear part of the upper chamber 25 and the rear part of the lower chamber 26 with each other. When the airbag 20 is inflated, the communication portion 29 becomes a substantially cylindrical elongated space, which extends vertically. The upper end of the communication portion 29 communicates with the upper chamber 25, and the lower end of the communication portion 29 communicates with the lower chamber 26.

The non-inflation section 31 is a section surrounded by the second inner joint 24, and is located in front of the communication portion 29. The non-inflation section 31 is an elongated space, which extends vertically. In the airbag 20, the upper chamber 25 and the communication portion 29 are adjacent to each other with the non-inflation section 31 located in between, and the lower chamber 26 and the communication portion 29 are adjacent to each other with the non-inflation section 31 located in between.

The auxiliary inflation section 32 is a section inflated by gas in a state of being wound around the communication portion 29. When the auxiliary inflation section 32 is not wound around the communication portion 29, the auxiliary inflation section 32 is an elongated space that extends rearward from the communication portion 29 (see FIG. 4). Thus, the non-inflation section 31 is located in front of the communication portion 29, and the auxiliary inflation section 32 is located at the rear of the communication portion 29. The auxiliary inflation section 32 is connected to the communication portion 29, the upper chamber 25, and the lower chamber 26.

The airbag 20 further includes, in order from the front to the rear of the airbag 20, vent holes 33, a through hole 34, an inflator insertion opening 35, a pair of bolt through holes 36, a pair of inner engaging holes 37, and a pair of outer engaging holes 38.

The vent holes 33 are holes for discharging gas in the gas discharge chamber 27. The vent holes 33 are open in part of the airbag 20 corresponding to the gas discharge chamber 27. The vent holes 33 may be provided in one or both of the overlapping parts 21A, 21B.

A section A of the airbag 20 corresponding to the auxiliary inflation section 32 is inserted in the through hole 34. The through hole 34 is provided opposite to the section A with respect to the communication portion 29 (on the right side in FIG. 4). The through hole 34 is provided at a section of the overlapping parts 21A, 21B corresponding to the non-inflation section 31, that is, the section surrounded by the second inner joint 24. The through hole 34 is an elongated slit, which extends substantially vertically. As shown in FIGS. 5(A) and 5(B), the length of the through hole 34 is W1, and the maximum width of part of the section A inserted in the through hole 34 is W2. The length W1 of the through hole 34 is set slightly greater than the width W2 of the section A.

The inflator assembly 40 is inserted through the inflator insertion opening 35 and is arranged in the communication portion 29. The inflator insertion opening 35 is provided in the overlapping part 21A in the vicinity of the boundary between the communication portion 29 and the auxiliary inflation section 32. The inflator insertion opening 35 is an elongated slit, which extends vertically. The inflator insertion opening 35 is closed by the section A of the airbag 20 wound around the communication portion 29. Thus, when the length of the inflator insertion opening 35 is W3, the length W3 is set smaller than the width W2 of the section A.

As shown in FIGS. 5(A) and 6(B), the pair of bolt through holes 36 are provided apart from each other between the non-inflation section 31 and the inflator insertion opening 35. Also, the pair of inner engaging holes 37 are provided at the section A of the airbag 20, and are rearward of the bolt through holes 36 by a predetermined distance. When the section A is wound around the communication portion 29, the pair of inner engaging holes 37 match the pair of bolt through holes 36.

The pair of outer engaging holes 38 are provided in the section A of the airbag 20 at a position further rearward of the inner engaging holes 37 by a predetermined distance. When the section A is wound around the communication portion 29, the pair of outer engaging holes 38 match the pair of bolt through holes 36 and the pair of inner engaging holes 37.

<Inflator Assembly 40>

As shown in FIGS. 3, 6(A), and 6(B), the inflator assembly 40 includes a gas source, which is an inflator 41 in the first embodiment, and a retainer 42 mounted on the inflator 41. The inflator 41 is substantially cylindrical. The inflator 41 accommodates a gas generating agent (not shown). This type of inflator 41 generates gas by combustion reaction of the gas generating agent. A gas outlet 43, which discharges gas, is provided on one end of the inflator 41. The inflator 41 may be an inflator that discharges gas by breaking a partition of a high-pressure gas cylinder by an explosive and the like.

The retainer 42 functions as a diffuser and secures the inflator 41 to a frame 44 in the seat back 14 together with the airbag 20 (see FIG. 6(A)). The retainer 42 is formed by bending a metal plate into a substantially cylindrical elongated shape. The retainer 42 is provided with a pair of bolts 45.

The cross section of the inflator assembly 40 (excluding the bolts 45) along a surface perpendicular to the axis of the inflator assembly 40 is smaller than the cross section of the communication portion 29 when being inflated. Also, in a state where the section A corresponding to the auxiliary inflation section 32 is not wound around the communication portion 29 (see FIG. 4), the inflator insertion opening 35 is not closed by the section A of the airbag 20 and is open in the vicinity of the communication portion 29. The inflator assembly 40 is inserted in the communication portion 29 through the inflator insertion opening 35. The inflator assembly 40 extends substantially vertically and is arranged in the communication portion 29 with the gas outlet 43 facing downward.

In this arrangement, part of the communication portion 29 is occupied by the inflator assembly 40. Since the cross-sectional area of the inflator assembly 40 differs from that of the communication portion 29, when the communication portion 29 is inflated, an annular space 46 is formed in the communication portion 29 at a section other than the inflator assembly 40, that is, around the inflator assembly 40. The space 46 is connected to the upper chamber 25 and the lower chamber 26, and functions as a passage for gas between the upper and lower chambers 25, 26.

The bolts 45 of the retainer 42 are inserted in the bolt through holes 36 of the communication portion 29. Furthermore, as shown by a dashed line in FIG. 4, the section A of the airbag 20 is inserted in the through hole 34. Thus, the auxiliary inflation section 32 is arranged about and in the vicinity of the communication portion 29 so as to extend astride the upper and lower chambers 25, 26. The section A of the airbag 20 is loosely wound around the communication portion 29 after being inserted in the through hole 34. The section A of the airbag 20 is desirably wound around the communication portion 29 at least once so that when the section A of the airbag 20 is inflated, the flow passage area of the communication portion 29 is reduced. In the first embodiment, the section A of the airbag 20 is wound around the communication portion 29 by one and a quarter turns.

In this winding process, the section A of the airbag 20 is engaged with the inner engaging holes 37 and the outer engaging holes 38 by the bolts 45 (see FIG. 6(B)). The inflator insertion opening 35 is located inward of the section A of the airbag 20 that is wound as described above. Part of the section A of the airbag 20 covers the inflator insertion opening 35. The section A of the airbag 20 is loosely wound around the communication portion 29 such that gas can flow into and inflate the auxiliary inflation section 32.

The airbag module 15 is made compact by folding the deployed airbag 20. In this state, the airbag module 15 is secured to the frame 44 by inserting the bolts 45 of the retainer 42 in the frame 44 inside the seat back 14, and tightening nuts (not shown) to the distal ends of the bolts 45.

The side airbag apparatus includes, besides the above mentioned airbag module 15, an impact sensor and a controller, which are not shown. The impact sensor is configured by, for example, an acceleration sensor, and is provided in the body side portion 11 of the vehicle (see FIG. 2). The impact sensor detects impact applied from the side of the body side portion 11. The controller controls operation of the inflator 41 based on a detection signal from the impact sensor.

In the above mentioned side airbag apparatus, when impact greater than or equal to a predetermined value applied to the body side portion 11 is detected by the impact sensor, a drive current is sent to the inflator 41 from the controller based on the detection signal. The drive current heats the inflator 41 so that high temperature and pressure gas is generated from gas generating agent in the inflator 41. The gas is discharged from the gas outlet 43.

The gas discharged from the inflator 41, first, flows into the lower chamber 26. The gas flow starts inflating the section C (see FIG. 3) of the airbag 20 corresponding to the lower chamber 26. Thereafter, the section C of the airbag 20 is deployed substantially forward while being unfolded.

Also, at this time, part of the communication portion 29 excluding the inflator assembly 40, that is, the annular space 46 around the inflator assembly 40 functions as a passage for gas (see FIG. 6(B)). Furthermore, since the space 46 is connected to both the upper chamber 25 and the lower chamber 26, some of the gas flows into the upper chamber 25 through the space 46, when the lower chamber 26 is supplied with a certain amount of gas. The gas flow causes the section B (see FIG. 3) of the airbag 20 corresponding to the upper chamber 25 to start inflating slightly later than the section C corresponding to the lower chamber 26. Thereafter, the section C of the airbag 20 is deployed substantially forward while being unfolded.

Some of the gas discharged from the gas outlet 43 is also supplied to the upper chamber 25 via a gap G (see FIG. 6(B)) between the inflator 41 and the retainer 42. However, the amount of such gas is very small compared to the amount of gas supplied to the upper chamber 25 through the space 46.

In this manner, the gas from the inflator 41 is first supplied to the lower chamber 26, and then supplied to the upper chamber 25 after the lower chamber 26 is inflated by a certain degree. Thus, the section C of the airbag 20 corresponding to the lower chamber 26 is inflated with a higher internal pressure beside the lumbar region Pp of the occupant P. Subsequently, the section B of the airbag 20 corresponding to the upper chamber 25 is inflated with a lower internal pressure beside the chest region Pt and the abdominal region Ps of the occupant P. Due to such inflation manner of the airbag 20, the airbag 20 has the internal pressure difference between the upper and lower chambers 25, 26. Thus, the airbag 20 contacts the occupant P with the internal pressure appropriate to the impact resistance of each part of the occupant P, and parts of the occupant P are effectively protected from the impact.

Figure 7:
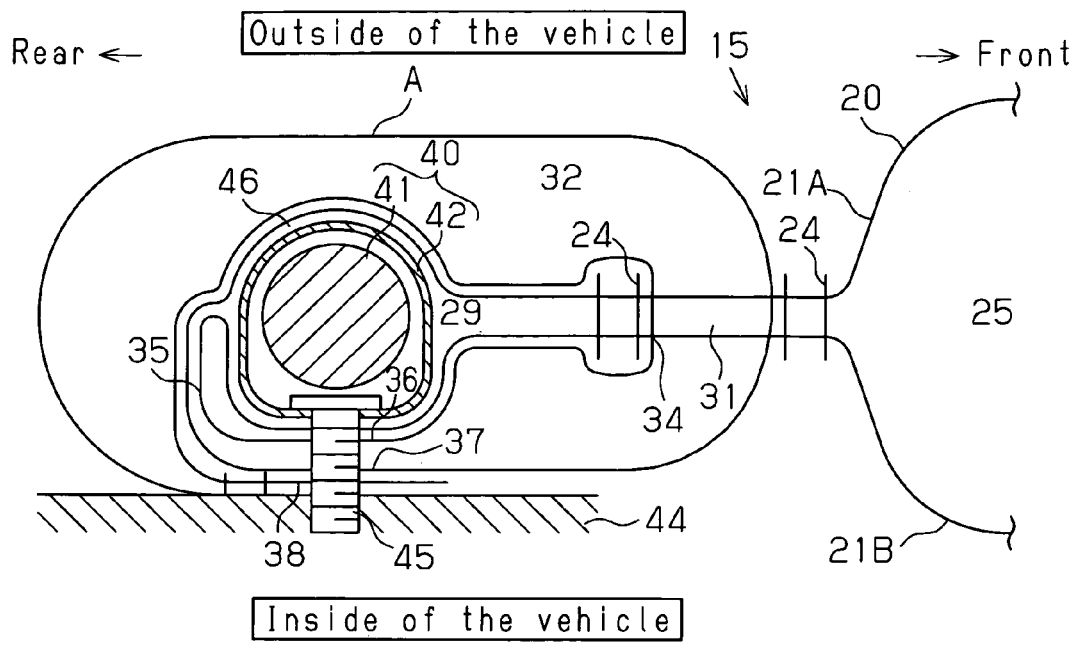
FIG. 7 is an enlarged cross-sectional plan view partially illustrating the auxiliary inflation section and the surrounding part when the auxiliary inflation section is inflated.

In the inflation process of the airbag 20 described above, after the upper and lower chambers 25, 26 are inflated by a certain degree, gas flows into the auxiliary inflation section 32 wound around the communication portion 29. As the gas is distributed evenly in the auxiliary inflation section 32, the auxiliary inflation section 32 is inflated around the communication portion 29 as shown in FIG. 7. At this time, the auxiliary inflation section 32 is inflated both outward and inward around the communication portion 29. In particular, as the auxiliary inflation section 32 is inflated inward, the inner diameter of the auxiliary inflation section 32 is reduced. Accordingly, the section of the airbag 20 corresponding to the communication portion 29 and inward of the auxiliary inflation section 32 becomes constricted, thereby reducing the diameter of the section corresponding to the communication portion 29. Thus, the flow passage area of the communication portion 29 (annular space 46) is reduced, and the flow of gas in the communication portion 29 is suppressed.

As a result, the internal pressure difference generated between the upper and lower chambers 25, 26 differs from that of the conventional apparatus in which the flow passage area of the communication portion 29 does not change. When the communication portion 29 is closed by the inflated auxiliary inflation section 32, the flow of gas in the communication portion 29 is blocked, which reduces the change in the internal pressure difference between the upper and lower chambers 25, 26 due to the gas flow in the communication portion 29.

In the preferred embodiment in which the inflator assembly 40 is arranged in the communication portion 29, part of the communication portion 29 is occupied by the inflator assembly 40. Thus, the substantial flow passage area of the communication portion 29 is reduced by the amount corresponding to the inflator assembly 40. Thus, compared to a case where the inflator assembly 40 is arranged at a position other than the communication portion 29, the auxiliary inflation section 32 closes the communication portion 29 by small inflation amount.

Furthermore, the airbag 20 is provided with the through hole 34 for the section A of the airbag 20 to be inserted. Thus, gas might leak from the through hole 34. However, the through hole 34 is surrounded by the second inner joint 24 having no ends. Thus, the gas supplied to the upper and lower chambers 25, 26, the communication portion 29, and the auxiliary inflation section 32 does not flow into the through hole 34 located inward of the second inner joint 24. Therefore, gas does not leak from the through hole 34.

Furthermore, when the airbag 20 is inflated, gas might leak from the inflator insertion opening 35, which is open in the vicinity of the communication portion 29. However, in this embodiment, the inflated auxiliary inflation section 32 depresses at least the circumferential portion of the inflator insertion opening 35. This hermetically closes the inflator insertion opening 35, thereby preventing the gas in the airbag 20 from leaking from the inflator insertion opening 35.

When receiving impact from the side of the vehicle, the airbag 20 inflated as described above is compressed between the body side portion 11 and the occupant P (see FIG. 2). At this time, part of the gas that fills the upper chamber 25 flows into the gas discharge chamber 27 via the slits 28 of the first inner joint 23. Furthermore, the gas that has flowed into the gas discharge chamber 27 passes through the vent holes 33 and is discharged outside of the airbag 20. Such a gas flow suppresses increase in the internal pressure of the upper chamber 25.

The first embodiment has the following advantages.

(1) The auxiliary inflation section 32 is provided at part of the airbag 20. The auxiliary inflation section 32 is inflated around the communication portion 29 by gas. Thus, the flow of gas at the communication portion 29 is controlled using the inflation of the auxiliary inflation section 32. Therefore, it is possible to set the transient property of the internal pressure difference between the upper and lower chambers 25, 26.

In particular, the timing at which the auxiliary inflation section 32 is inflated is varied by appropriately setting the ease of gas flow to the auxiliary inflation section 32. This changes the amount of gas flow in the communication portion 29 and thus controls the flow of gas from the lower chamber 26 to the upper chamber 25. For example, the communication portion 29 may be closed after the lower chamber 26 is supplied with a certain amount of gas.

(2) The auxiliary inflation section 32, which is part of the airbag 20, closes the communication portion 29 to block the flow of gas in the communication portion 29. With this configuration, the tightening member such as a hose band disclosed in Japanese Laid-Open Patent Publication No. 2004-210048 is unnecessary. Thus, the number of the components of the side airbag apparatus is reduced, which reduces the costs.

(3) In the conventional side airbag apparatus in which the inflator including one gas outlet is arranged in the communication portion, the communication portion 29 cannot be closed. Thus, to secure the internal pressure difference between the upper chamber 25 and the lower chamber 26, the communication portion 29 cannot be enlarged. In contrast, if the communication portion 29 is small, gas is suppressed from flowing from the lower chamber 26 to the upper chamber 25, which increases the time taken for the upper chamber 25 to be filled with gas, which delays the inflation of the airbag 20.

However, in the first embodiment, the inflated auxiliary inflation section 32 reduces the flow passage area of the communication portion 29. Thus, although the communication portion 29 is large, the communication portion 29 can be closed. Thus, the upper chamber 25 is quickly inflated by increasing the amount of gas flow in the communication portion 29. Furthermore, the internal pressure difference between the upper and lower chambers 25, 26 is secured by closing the communication portion 29.

(4) The inflator assembly 40 is arranged in the communication portion 29. Thus, the communication portion 29 is closed by inflating the auxiliary inflation section 32 by a small amount.

(5) The airbag 20 is provided with the non-inflation section 31, which extends astride the upper and lower chambers 25, 26. The upper chamber 25 and the communication portion 29 are adjacent to each other with the non-inflation section 31 located in between, and the lower chamber 26 and the communication portion 29 are adjacent to each other with the non-inflation section 31 located in between. Also, the non-inflation section 31 is formed by the second inner joint 24, which does not have ends. The through hole 34 is provided in the non-inflation section 31. With this configuration, by inserting the section A of the airbag 20 corresponding to the auxiliary inflation section 32 into the through hole 34, the section A of the airbag 20 is arranged about and in the vicinity of the communication portion 29 while extending astride the upper and lower chambers 25, 26 while preventing leakage of gas from the upper and lower chambers 25, 26, the communication portion 29, and the auxiliary inflation section 32.

(6) The auxiliary inflation section 32 is wound around the communication portion 29. Thus, the auxiliary inflation section 32 reduces the flow passage area of the communication portion 29 by surrounding the communication portion 29 and being inflated in this state to form an annular shape. Therefore, the advantages (1) to (5) are reliably obtained.

(7) The inflator insertion opening 35 is provided at part of the airbag 20 in the vicinity of the communication portion 29 and around which the auxiliary inflation section 32 is wound. Thus, while permitting the inflator assembly 40 to be inserted in the communication portion 29, when the airbag 20 is inflated, the inflation of the auxiliary inflation section 32 seals the inflator insertion opening 35 such that gas does not leak from the inflator insertion opening 35. Therefore, members and mechanisms for preventing leakage of gas from the inflator insertion opening 35 are unnecessary.

(8) A configuration other than that in the first embodiment may be employed to close the inflator insertion opening 35. For example, a tongue piece may be provided in the vicinity of the inflator insertion opening 35. More specifically, the tongue piece may be laid over the inflator insertion opening 35 of the airbag 20, and be tightened to the frame 44 of the seat back 14 together with other part of the airbag 20 using the bolts 45 of the retainer 42. With this configuration, tightening of the inflator 41 to the frame 44 closes the inflator insertion opening 35, thereby suppressing leakage of gas. However, with this configuration, the tongue piece is pressed against the circumferential portion of the inflator insertion opening 35 only by the tightening of the bolts 45. Thus, if the inflator 41 is not appropriately tightened to the frame 44, the tongue piece will not be pressed against the entire circumference of the inflator insertion opening 35. Therefore, it is difficult to reliably seal between the tongue piece and the inflator insertion opening 35.

In this regard, in the first embodiment, since the inflated auxiliary inflation section 32 is pressed against the entire circumference of the inflator insertion opening 35 as described above, sealing between the inflator insertion opening 35 and the auxiliary inflation section 32 is increased. This reliably suppresses leakage of gas from the inflator insertion opening 35.

(9) The auxiliary inflation section 32 is provided with the inner engaging holes 37 and the outer engaging holes 38. The section A of the airbag 20 wound around the communication portion 29 is secured to the frame 44 by the bolts 45 of the retainer 42 at the inner and outer engaging holes 37, 38. Thus, members and mechanisms for winding and retaining the section A of the airbag 20 around the communication portion 29 are unnecessary.

Second Embodiment

Figure 8:
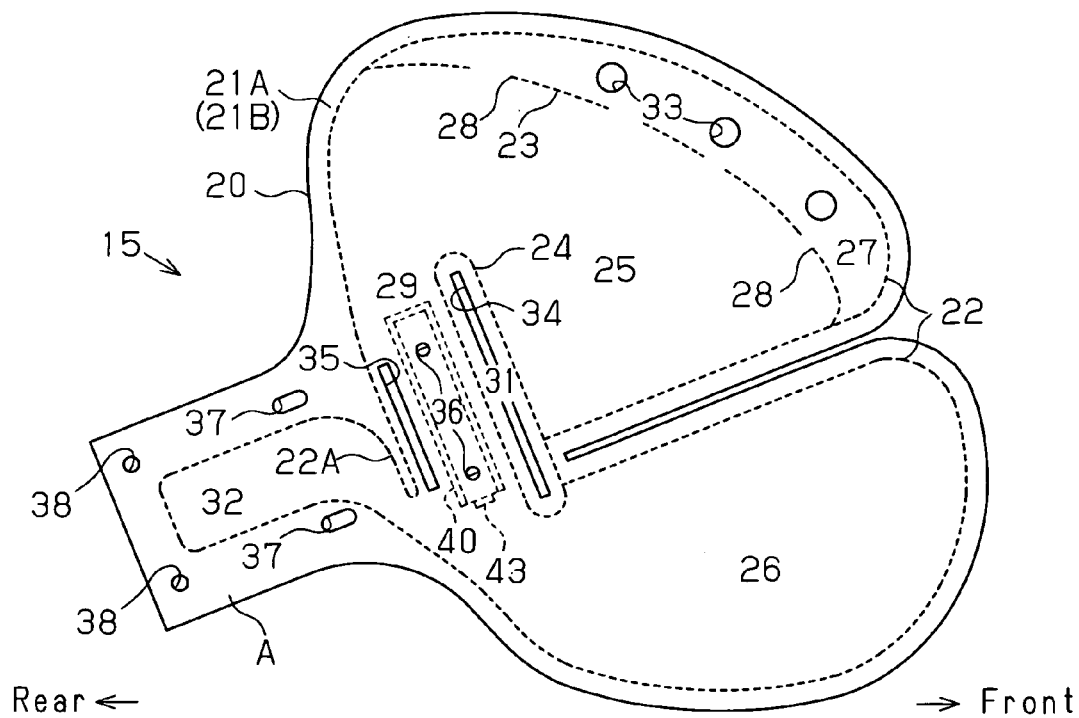
FIG. 8 is a side view of an airbag module, showing a state before an auxiliary inflation section according to a second embodiment of the present invention is wound around a communication portion.

A second embodiment of the present invention will now be described with reference to FIG. 8. In FIG. 8, the same reference numerals are given to sections and members that are the same as those in the first embodiment.

As shown in FIG. 8, the second embodiment differs from the first embodiment, in which the auxiliary inflation section 32 communicates with the upper and lower chambers 25, 26, in that the auxiliary inflation section 32 communicates with only the lower chamber 26 the internal pressure of which is higher than that of the upper chamber 25. Furthermore, the auxiliary inflation section 32 communicates with only the lower part of the communication portion 29. In the second embodiment, a boundary section 22A of the peripheral joint 22 between the upper chamber 25 and the auxiliary inflation section 32 extends to the vicinity of the lower chamber 26 between the communication portion 29 (inflator insertion opening 35) and the auxiliary inflation section 32.

According to the second embodiment, gas flows to the auxiliary inflation section 32, which is wound around the communication portion 29, from only the lower chamber 26 the internal pressure of which is high. Thus, during the inflation process of the airbag 20, gas flows into and inflates the auxiliary inflation section 32 at a relatively early stage so that the flow passage area of the communication portion 29 (annular space 46) is reduced, thereby restricting the flow of gas to the upper chamber 25. In this case, the time at which the communication portion 29 is closed by the auxiliary inflation section 32 is earlier.

Thus, the second embodiment has the following advantage in addition to the advantages (1) to (9) of the first embodiment.

(10) The auxiliary inflation section 32 communicates with only the lower chamber 26. Thus, the communication portion 29 is closed at an early stage, and the gas flow to the upper chamber 25 is blocked at an early stage. Thus, the internal pressure difference between the upper and lower chambers 25, 26 is increased.

Third Embodiment

Figure 9:
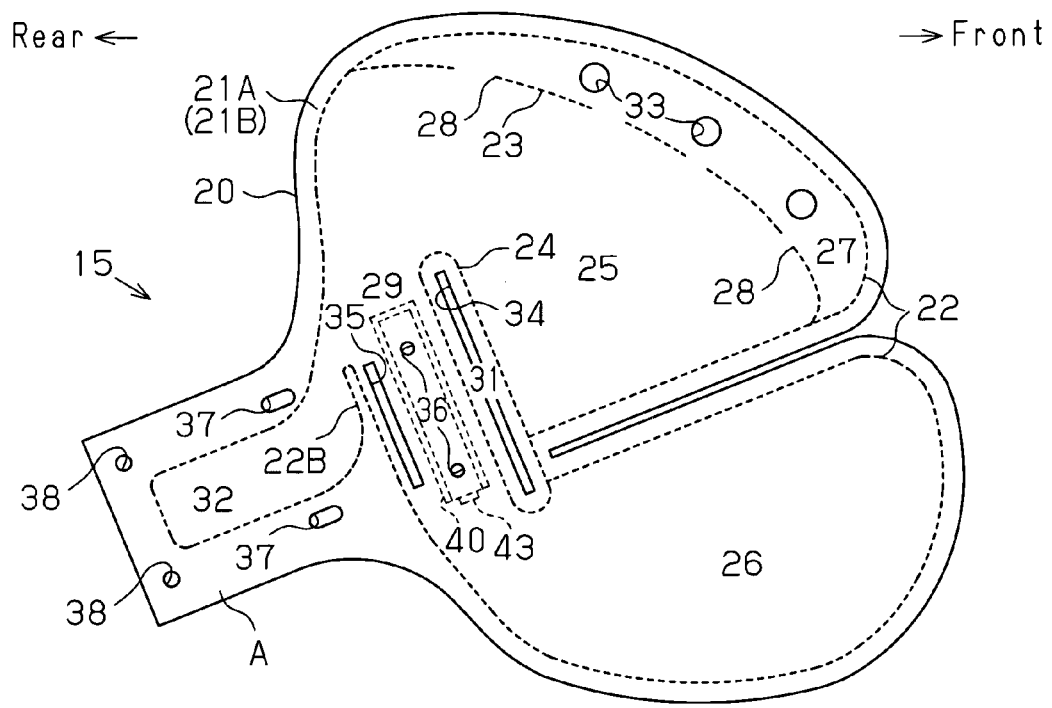
FIG. 9 is a side view of an airbag module, showing a state before an auxiliary inflation section according to a third embodiment of the present invention is wound around a communication portion.

A third embodiment of the present invention will now be described with reference to FIG. 9. In FIG. 9, the same reference numerals are given to sections and members that are the same as those in the first embodiment.

As shown in FIG. 9, the third embodiment differs from the first embodiment, in which the auxiliary inflation section 32 communicates with the upper and lower chambers 25, 26, in that the auxiliary inflation section 32 communicates with only the upper chamber 25 the internal pressure of which is lower than that of the lower chamber 26. Furthermore, the auxiliary inflation section 32 communicates with only the upper portion of the communication portion 29. In the third embodiment, a boundary section 22B of the peripheral joint 22 between the lower chamber 26 and the auxiliary inflation section 32 extends to the vicinity of the upper chamber 25 between the communication portion 29 (inflator insertion opening 35) and the auxiliary inflation section 32.

According to the third embodiment, gas flows into the auxiliary inflation section 32, which is wound around the communication portion 29, from only the upper chamber 25 the internal pressure of which is low. Thus, during the inflation process of the airbag 20, the flow passage area of the communication portion 29 is hardly reduced by the auxiliary inflation section 32 until the lower chamber 26 is filled with gas and the upper chamber 25 is subsequently supplied with a certain amount of gas. That is, the communication state at the communication portion 29 is maintained equivalent to that when the auxiliary inflation section 32 is not inflated.

After the upper chamber 25 is supplied with a certain amount of gas, the gas flows into the auxiliary inflation section 32 from the upper chamber 25. Such gas flow inflates the auxiliary inflation section 32, thereby reducing the flow passage area of the communication portion 29. This suppresses the flow of gas in the communication portion 29. As a result, the gas flow from the lower chamber 26 to the upper chamber 25 is restricted.

The third embodiment has the following advantage in addition to the advantages (1) to (9) of the first embodiment.

(11) The auxiliary inflation section 32 communicates with only the upper chamber 25. Thus, the communication state of gas in the communication portion 29 is maintained until a sufficient amount of gas is supplied to the upper chamber 25.

The present invention may be embodied in the following modifications.

In each of the embodiments, the gas outlet 43 is provided on only one end of the inflator 41. Instead, the inflator 41 may be used that has two gas outlets with different gas discharge amount per unit time at different positions along the axial direction. The structure for providing different gas discharge amount between two different gas outlets includes, for example, (i) a type that accommodates one kind of gas generating agent in two accommodation chambers provided in the inflator 41, and (ii) a type that accommodates two kinds of gas generating agents with different gas generation amount per unit time in two accommodation chambers provided in the inflator 41. In the case with the former type (i), the accommodation amount of the gas generating agent may be set different between the two accommodation chambers.

In this case, the inflator 41 is arranged in the communication portion 29 such that the gas outlet with greater gas discharge amount is oriented toward the lower chamber 26 in which the internal pressure becomes higher, and the gas outlet with smaller gas discharge amount is oriented toward the upper chamber 25 in which the internal pressure becomes lower.

In this case, gas is discharged from each gas outlet corresponding to the upper chamber 25 and the lower chamber 26. Based on the difference between the gas discharge amount per unit time, the lower chamber 26 is inflated earlier, and thereafter, the gas passes through the communication portion 29 and flows into the upper chamber 25. Thus, compared to the first and second embodiments which employ the inflator 41 including the gas outlet 43 on only one end, the gas discharging manner is slightly different. However, since the gas flows into the communication portion 29 in the same manner as in the first embodiment, the same operations and advantages as the first embodiment are obtained.

The operation in which the lower chamber 26 is inflated and deployed with high internal pressure beside the lumbar region Pp, and the upper chamber 25 is inflated and deployed with low internal pressure beside the chest region Pt while setting the transient property of the internal pressure difference between the upper and lower chambers 25, 26, is most effectively achieved when the inflator 41 including the gas outlet 43 on only one end is used as described in the first embodiment. This is because gas flows through the lower chamber 26, the communication portion 29, the upper chamber 25 in this order, and moreover, the flow passage area of the communication portion 29 is reduced by the inflation of the auxiliary inflation section 32.

Figure 10:
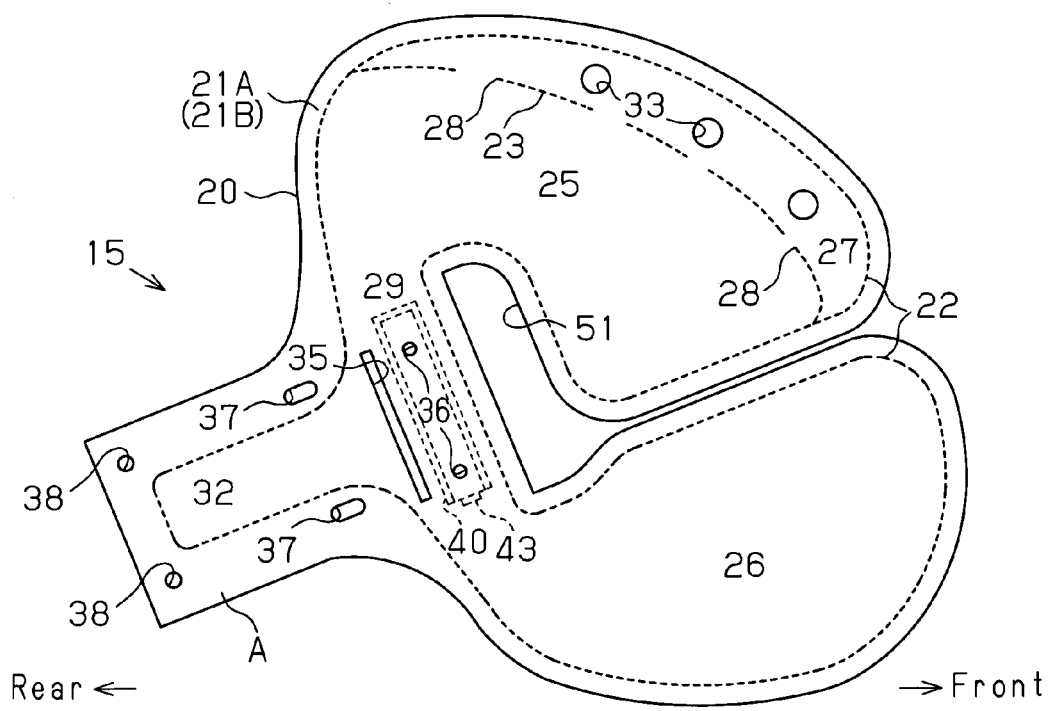
FIG. 10 is a side view illustrating an airbag module according to a modified embodiment equipped with an airbag provided with an opening in the vicinity of a communication portion.

The present invention may be applied to a side airbag apparatus equipped with an airbag 20 that does not include the non-inflation section 31. For example, as shown in FIG. 10, an opening 51 is provided at part of the airbag 20 corresponding to the non-inflation section 31, and the peripheral joint 22 is provided on the circumferential portion of the opening 51. The opening 51 functions in the same manner as the through hole 34 of the first embodiment. Thus, the section A of the airbag 20 is inserted in the opening 51 and wound around the communication portion 29.

Figure 11:
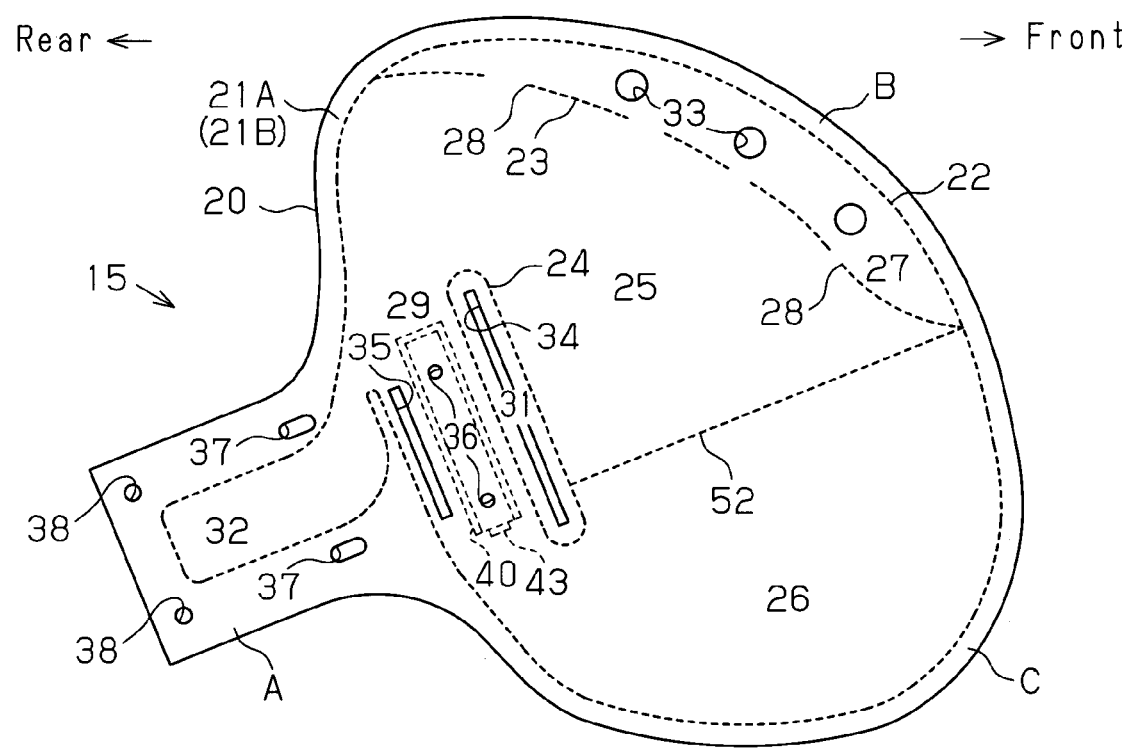
FIG. 11 is a side view illustrating an airbag module according to a modified embodiment equipped with an airbag in which an upper chamber and a lower chamber are separated by a partition.

In the first embodiment, the section B corresponding to the upper chamber 25 and the section C corresponding to the lower chamber 26 are completely separate as shown in FIG. 3. Instead, the upper chamber 25 and the lower chamber 26 may be separated by a partition 52 such as a tether and a seam as shown in FIG. 11. The tether is made of a fabric belt, and is arranged between the overlapping parts 21A, 21B. Furthermore, the side edges of the tether are sewn to the overlapping parts 21A, 21B, respectively. The tether connects the overlapping parts 21A, 21B with a predetermined interval. The seam is configured by a sewn part that is sewn using sewing thread. The seam connects the overlapping parts 21A, 21B in a state where the overlapping parts 21A, 21B contact each other.

In general, the impact resistance of side portion of a human body is the highest at the lumbar region Pp, and is low at other regions, in particular, the chest region Pt and the abdominal region Ps. Thus, when the airbag is provided with the pair of chambers that communicate with each other via the communication portion 29, one of the chambers is preferably inflated beside the lumbar region Pp, and the other one of the chambers is preferably inflated beside regions other than the lumbar region Pp. Thus, in the above embodiments, the upper chamber 25 is inflated beside the chest region Pt and the abdominal region Ps. However, instead, the upper chamber 25 may be inflated beside the chest region Pt, the abdominal region Ps, the shoulder region, and the head.

Furthermore, an airbag 20 including three or more chambers may be used. In this case, at least two chambers need to communicate with each other via the communication portion 29.

The present invention may be applied to a side airbag apparatus as described below. (a) A side airbag apparatus in which, when the airbag 20 is completely inflated, the airbag 20 does not inflate in the vicinity of an area beside at least one of the chest region Pt and the abdominal region Ps of the occupant P. (b) A side airbag apparatus that has no first inner joint 23, and no gas discharge chamber 27 separate from the upper chamber 25. (c) A side airbag apparatus in which the inflator assembly 40 is arranged at a section different from the communication portion 29. (d) A side airbag apparatus in which the inflator 41 is directly installed in the seat back 14 without using the retainer 42. (e) A side airbag apparatus mounted on the body side portion 11 instead of the seat back 14. (f) A side airbag apparatus in which the auxiliary inflation section 32 is arranged about the communication portion 29 by a method other than winding.

The invention claimed is:

1. A side airbag apparatus, which reduces impact from a side of a vehicle to protect an occupant, the apparatus comprising:
    an inflator, which discharges gas;
    an airbag, which is inflated and deployed between a body side portion of the vehicle and the occupant by gas discharged from the inflator in response to impact from the side of the vehicle;
    a pair of chambers formed by partitioning an internal space of the airbag, wherein one of the pair of chambers is deployed and inflated with higher internal pressure than the other one;
    a communication portion provided in the airbag, wherein the pair of chambers communicate with each other via the communication portion; and
    an auxiliary inflation section, which is part of the airbag and is inflated around the communication portion by the gas,
    wherein the auxiliary inflation section is wound around the communication portion.

2. The side airbag apparatus according to claim 1, wherein the inflator is arranged in the communication portion.

3. The side airbag apparatus according to claim 1, further comprising:
    a non-inflation section provided in the airbag to extend astride the chambers,
    wherein the non-inflation section is formed such that gas does not flow thereinside,
    wherein one of the pair of chambers and the communication portion are adjacent to each other with the non-inflation section located in between, and the other one of the chambers and the communication portion are adjacent to each other with the non-inflation section located in between, and
    wherein the non-inflation section is further provided with a through hole in which part of the auxiliary inflation section is inserted.

4. The side airbag apparatus according to claim 3, wherein the non-inflation section is formed by sewing a pair of overlapping parts configured by base fabric sheets in an annular shape with sewing thread.

5. The side airbag apparatus according to claim 1, further comprising:
    an inflator insertion opening provided in the airbag to permit the inflator to be inserted in the communication portion,
    wherein the inflator insertion opening is provided at a section in the vicinity of the communication portion and about which section the auxiliary inflation section is wound.

6. The side airbag apparatus according to claim 1, wherein the auxiliary inflation section communicates with only one of the chambers, the internal pressure of which is higher than that of the other chamber.

7. The side airbag apparatus according to claim 1, wherein the auxiliary inflation section communicates with only one of the chambers, the internal pressure of which is lower than that of the other chamber.

* * * * *